United States Patent [11] 3,634,627

[72] Inventor Nicola Velentini
Rome, Italy

[21] Appl. No. 56,765
[22] Filed July 21, 1970
[45] Patented Jan. 11, 1972
[73] Assignee Societa Italiana Telecommunicazioni Siemens S.p.A.
Milan, Italy
[32] Priority July 23, 1969
[33] Italy
[31] 19,994-A/69

[54] CHANNEL-ALLOCATION SYSTEM FOR A CHANNEL-ADDRESSING MULTIPLE-ACCESS TELECOMMUNICATION SYSTEM

17 Claims, 5 Drawing Figs.

[52] U.S. Cl. 179/15 BA, 325/4, 179/41 A
[51] Int. Cl. H04j 3/12
[50] Field of Search 179/15 BM, 15 BA, 41 A; 325/4

[56] References Cited

UNITED STATES PATENTS

| | | | |
|---|---|---|---|
| 3,170,118 | 2/1965 | Logan | 179/15 BM |
| 3,351,714 | 11/1967 | Kunzelman et al. | 179/41 A |
| 3,458,664 | 7/1969 | Adlhoch et al. | 179/41 A |
| 3,513,264 | 5/1970 | Baer | 179/15 BA |
| 3,517,312 | 6/1970 | Yamato et al. | 325/4 |
| 3,564,147 | 2/1971 | Puente | 325/4 |

*Primary Examiner*—Kathleen H. Claffy
*Assistant Examiner*—David L. Stewart
*Attorney*—Karl F. Ross

ABSTRACT: In a channel-addressing multiple-access telecommunication system, a channel-allocation system is disclosed in which all stations scan the available channels. An available channel is seized by transmitting on that channel one of two channel-supervisory indications and the address of the called station. Receipt of said one channel-supervisory indication causes all stations to arrest scanning on the seized channel. The called station, upon reception and recognition of its own address transmits the other of said two channel-supervisory indications and its own address as an acknowledgement. Upon receipt of the acknowledgement, the calling station switches from transmission of said one to transmission of the other of said two channel-supervisory indications. A repeater embodiment is also disclosed.

Nicola Valentini
INVENTOR.

BY Karl F. Ross
Attorney

PATENTED JAN 11 1972 3,634,627

SHEET 2 OF 5

INVENTOR:
Nicola Valentini

BY

Karl G. Ross
Attorney

Nicola Valentini

INVENTOR.

BY Karl F. Ross

Attorney

Nicola Valentini
INVENTOR.

BY Karl G. Ross
Attorney

INVENTOR:
Nicola Valentini
BY
Karl G. Ross
Attorney

CHANNEL-ALLOCATION SYSTEM FOR A CHANNEL-ADDRESSING MULTIPLE-ACCESS TELECOMMUNICATION SYSTEM

My present invention relates to a multiple-access telecommunication system of the channel-addressing i.e., a system wherein a multiplicity of subscriber stations are served by a limited number of channels to establish two-way communication therebetween.

The term "subscriber station," as used herein, is not limited to the terminals of commercial networks but includes military posts and other facilities that can be utilized free of charge. The basic system underlying this invention has been described, for example, in an article by Arnold M. McCalmont entitled "Multiple-access Discrete-address Communication Systems," published in the Aug. 1967 issue of IEEE Spectrum (pgs. 87–94).

In such a system a subscriber desiring to communicate with a remote station may seize any available channel and broadcast over that channel the address of the desired station. As all the channels are continuously or periodically monitored by each subscriber station, the called party (if not engaged in communication over another channel) may also lock in on the same channel whereupon the exchange of messages can proceed. This principle is applicable to communication channels of any type separated spacially, in frequency, in time or in any other conventional manner; the term "channel" is therefore meant to include cables, radio links, and time slots of time-sharing multiplex systems.

The known advantages of such channel-addressing communication systems, when compared with earlier systems of the message-addressing type (as likewise discussed in the aforementioned article), include better utilization of available frequency bands or other transmission facilities which otherwise would become overcrowded. Thus, the permanent assignment of certain frequencies (e.g. bands of 25 kHz. in a range of 150 to 170 mHz.) to specific subscribers may result in a partial underutilization of the spectrum, as where some channels are allotted to stations (say, emergency shelters in the mountains) using the facilities only infrequently.

The general object of this invention is to provide relatively simple means for carrying out the required operation of channel scanning, monitoring and seizure, transmission and recognition of addresses, and establishment as well as termination of a connection between two stations in a channel-addressing system as defined above.

More specifically, my invention aims at providing equipment which can be standardized for use, with only minor changes, in a terminal station or in a repeater stage associated with such a communication system.

A system according to my invention employs channels capable of carrying supervisory signals along with message and address information between two communicating stations, the supervisory signals being distinguishable from the message and address information by their nature (e.g. continuous DC voltages on a wire, fixed frequencies in a radio-communication system) and/or by traveling over a separate path forming part of the channel. These supervisory signals include two distinct types of busy signals referred to hereinafter as request signals and engagement signals, respectively. In the present context, the term "busy signal" denotes a signal transmitted over a channel to indicate that a station has seized that channel for communication with another station, in contradistinction to the meaning of the term in conventional systems in which a station is understood to be busy when unavailable for a calling party because of a prior engagement elsewhere.

Each station has access to a number of such channels which may comprise some or all the channels of the system as more fully described hereinafter. The receiving section of the station is repetitively connected to each channel by conventional scanning means to explore its activity; the corresponding transmitting section is given access by the scanning means to any channel concurrently explored by the receiving section whereby such channel, if available, may be seized for initiating an outgoing call. A channel monitor connected to the receiver determines the idle state of a channel from the absence of an incoming busy signal (of either the request or the engagement type) at the instant of exploration; if the channel is to be seized, the scan is halted by a readiness signal which may be locally generated, either by an operator (e.g. a subscriber at a calling terminal station) or by automatic equipment (as in the case of a repeater stage receiving a call from an affiliated terminal station). A signal generator, actuated by the channel monitor in response to the readiness signal and to the concurrent absence of an incoming busy signal, thereupon emits an outgoing request signal which is successively picked up by all the other stations exploring this particular channel. Any of these remote stations, upon detecting the incoming request signal, also arrests its scanner and causes its own signal generator to emit an outgoing engagement signal over the channel thus seized; if such an engagement signal is not forthcoming within a predetermined period, or ceases to be received, a disconnect circuit at the originating station releases the channel by reactivating the associated scanner.

In the more specific field of use envisaged for this invention in which the terminal stations are identified by individual addresses, each station also contains a register connectable to its transmitting section under the control of the channel monitor, upon detection of an incoming request signal, for accompanying the subsequent emission of the outgoing engagement signal with a readout of the address of the local station stored in that register. The calling station, at which the request signal originates, determines from the incoming address information the identity of the responding station and allows the call to proceed only if it finds itself connected to the proper party.

Usually, a calling station in such a system also has selector means (e.g. a dial) for entering, upon the inception of an outgoing call, the address of the calling station in its register for subsequent readout thereof together with the outgoing request signal, the receiver at the remote station being operative to emit a recognition signal upon detecting its own address accompanied by the request signal; there is also provided an incoming register for temporarily storing a received address and comparing it with the address previously entered in the outgoing register for transmission together with the request signal, an identity signal being generated by a comparator ascertaining a match between the two stored addressed. This identity signal, like the aforementioned recognition signal, causes the local signal generator to send out the engagement signal which maintains the state of seizure of the channel until either party terminates the call by discontinuing the transmission of its engagement signal.

The above and other features of my invention will be described in detail hereinafter with reference to the accompanying drawing in which.

TERMINAL STATION

Figure 1:
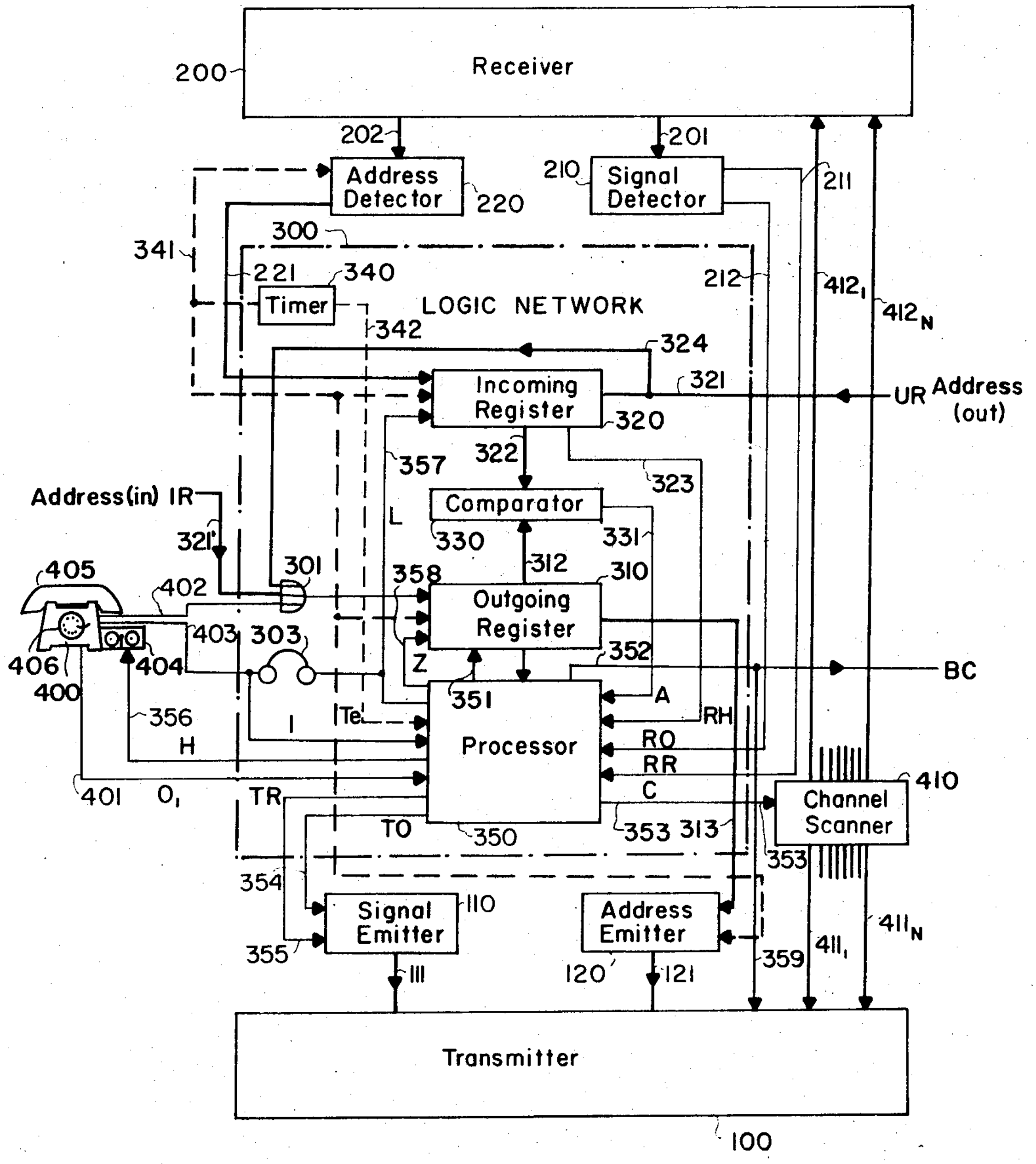
FIG. 1 is a block diagram of a subscriber station forming a terminal of a telecommunication system according to the invention.

The station shown in FIG. 1 comprises as its basic components a transmitter 100, a receiver 200, a logic network 300 interconnecting the two units 100 and 200, and a telephone apparatus 400 representative of any post for initiating and accepting calls.

The transmitting section of the station includes, besides the transmitter proper shown at 100, a signal emitter 110 and an address emitter 120 feeding this transmitter via respective leads 111 and 121. Similarly, the receiving section includes a signal detector 210 and an address detector 220 fed from the receiver proper, i.e., from the unit 200, via respective leads 201 and 202. Signal detector 210 has two output leads 211 and 212 terminating at a processor 350 within logic network 300, the energization of lead 211 representing an incoming request signal RR whereas the energization of lead 212 denotes the arrival of an incoming engagement signal RO. Address detector 220 has an output lead 221 terminating at an incoming register 320 for the temporary storage of a signal code identifying a station called by a remote party; lead 221, like other leads shown in the drawing, may of course represent a plurality of conductors designed to carry information, e.g. in digitized form.

Register 320 has an output lead 321 on which the addresses stored therein may be read out to another register of a similar station, in the form of code signals UR; this lead is not used when the equipment 100, 200, 300 forms part of a terminal station, except for a branch 324 thereof adapted to carry the stored address information to an incoming register 310 by way of a coupling circuit diagrammatically illustrated as an OR-gate 301 with output lead 302. Another output lead 322 of register 320 extends to a comparator 330 which also receives address information from register 310 via a lead 312. A third output lead 323 of register 320, terminating at processor 350, carries a recognition signal RH whenever this register determines, from an internal comparison circuit known per se, that an address received by unit 200 is that of its own station. Comparator 330, on ascertaining a match between the two addresses entered in registers 310 and 320, generates an identity signal A on an output lead 331 also terminating at processor 350. Register 310 has an output lead 311 for the transmission of a counting pulse MT to processor 350 for every readout of a code stored therein, via a lead 313, to address emitter 120.

A timer 340 has an output lead 341 for the transmission of basic clock pulses to registers 310 and 320, address emitter 120 and address detector 220 in the rhythm of the dial pulses constituting the call signals in the telephone communication system here contemplated. Another output lead 342 of timer 340 carries processor 350 a train of periodic clock pulses $Te$ determining the rate of channel exploration under the control of a scanner 410. It is assumed that the system contains N channels accessible to the station of FIG. 1, scanner 410 being therefore provided with a first set of output leads $\mathbf{411}_1$..... $\mathbf{411}_N$ terminating at transmitter 100 and with a second set of output leads $\mathbf{412}_1$ ..... $\mathbf{412}_N$ terminating at receiver 200.

Processor 350 has eight output leads 351–358. Lead 351 delivers to outgoing register 310 a readout signal TI instructing it to communicate its contents via lead 313 to address emitter 120. Lead 352 carries a signal BC, indicating seizure of a channel, to an outside destination; like the signal UR on lead 321, signal BC is significant only when the units 100, 200, 300 form part of a repeater stage (as in FIG. 3), the external part of lead 352 being functionless in the terminal station of FIG. 1 except for a branch 359 extending to transmitter 100 to enable same whenever a channel has been seized. Lead 353 applies stepping signals C, normally in the rhythm of clock pulse $Te$, to scanner 410. Leads 354 and 355 respectively deliver to signal emitter 110 an outgoing engagement signal TO and an outgoing request signal TR. Lead 356 carries a call signal H to a bell, buzzer, lamp or other alarm device 404 on apparatus 400; in the case of a repeater station, this signal H is transmitted to an interstage coupling network and possibly to a companion stage as described hereinafter with reference to FIG. 3. Lead 357, carrying a signal L whenever a channel explored by the station is found to be free, extends to register 320 for the purpose of clearing that register preparatorily to the arrival of new address information over this or some other available channel seized by the station. Lead 358, finally, is energized upon the release of a channel with a signal Z communicated to register 310 for clearing same.

Apparatus 400 has an output lead 401 which may be energized by the closure of a conventional hook switch, not shown, whenever the handset 405 is lifted and which then carries a readiness signal $\mathbf{0}_1$ to indicate that the subscriber operating the apparatus is about to initiate or to accept a call. Another output lead 402 of this apparatus delivers to register 310, via coupling circuit 301 and its output lead 302, the call number of a remote station selected by means of a dial 406 or equivalent signaling device. A further lead 403, energized as soon as dialing is completed, delivers to processor 350 a discrimination signal I to indicate the fact that the address delivered to register 310 comes from the local command post 400 and not (via lead 324) from storage circuit 320. In the case of a repeater, lead 403 is connected through a junction 303 to lead 357.

Coupling circuit 301 is also the terminus of a lead 321' which is the counterpart of lead 321 and, in the case of a repeater, originates at a companion stage to deliver an incoming address code IR analogous to the outgoing address code UR on lead 321.

Figure 2:
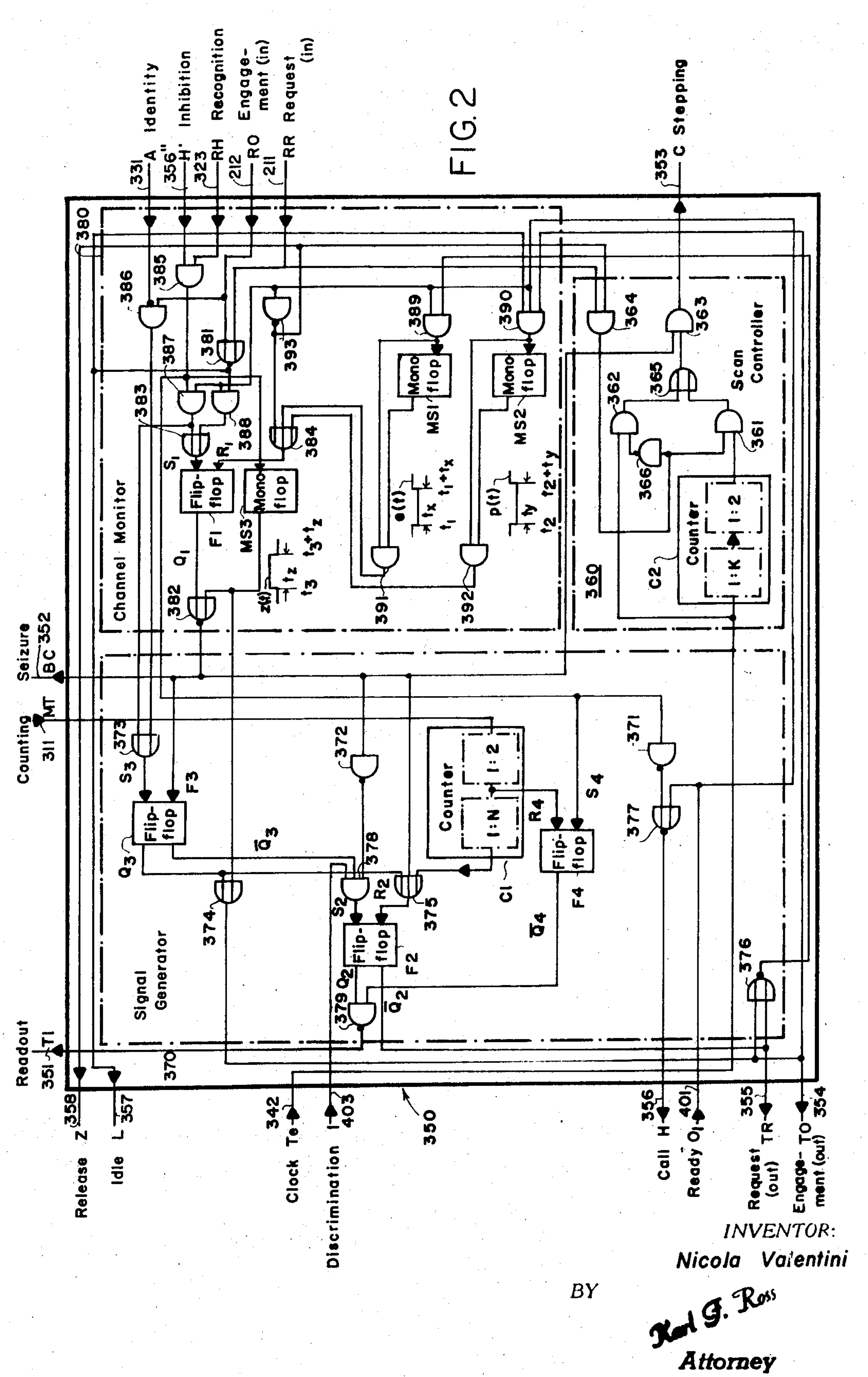
FIG. 2 is a more detailed circuit diagram of a processor included in the station of FIG. 1.

As shown in FIG. 2, processor 350 comprises three sections 360, 370 and 380. Section 360 controls the scanner 410 of FIG. 1 and receives the clock pulses $Te$ while emitting the stepping pulses C. Section 370 generates all the other signals emanating from the processor with the exception of idle signal L and release signal Z, the latter two signals originating at section 380 which acts as a channel monitor and receives signals A, RH, RO and RR as well as, in the case of one of the two repeater stages of FIG. 3 described hereinafter, an inhibition signal H' (on a lead 356'') derived from the call signal H of its companion stage.

Scan controller 360 includes several AND-gates 361–364, an OR-gate 365 and an inverter 366. Signal generator 370 includes a pair of inverters 371 and 372, OR-gates 373–375, NOR-gates 376 and 377, an AND-gate 378 and a NAND-gate 379. The logic circuitry of channel monitor 380 consists in part of NOR-gates 381 and 382, OR-gates 383 and 384, and AND-gate 385 with an inverting input connected to lead 356'' (this gate may be omitted where signal H' is not used), other AND-gates 386–392 and an inverter 393. Monitor 380 additionally contains a bistable circuit or flip-flop F1 and several monostable circuits or monoflops MS1, MS2 and MS3. Three further flip-flops F2, F3 and F4 are present in signal generator 370 which also includes a pulse counter C1 operating as a pulse frequency divider, this counter being split into a pair of cascaded sections of 2 and N stages, respectively, for an overall stepdown ratio of 1:2N. A similar counter C2, with an overall stepdown ratio of 1:2K. (where K. is the number of clock pulses $Te$ required to measure a time interval sufficient for the readout of an address) forms part of the scan controller 360; the pulses $Te$ may recur, for example, at the cadence of binary code combinations representing respective digits of a call signal, the number K being then equal to the number of digits in such a call signal.

I shall now describe the operation of the station shown in FIGS. 1 and 2 at rest, upon initiation of an outgoing call, and during reception of an incoming call.

QUIESCENT STATE

Monoflops MS1–MS3 are in their stable condition and flip-flops F1–F4 are reset. With all the incoming leads except conductor 342 deenergized, NOR-gate 382 has an output which appears on lead 352 as a disconnect signal $\overline{BC}$ indicating that no channel has been seized and that the scan is proceeding normally. Leads 357 and 358 are energized by the outputs of NOR-gate 381 and inverter 393, respectively, to whose inputs no signals are applied; the signals L and Z appearing on these leads are also fed to AND-gates 390 and 364, respectively, but do not create an output in these AND gates since their other inputs are deenergized. Inverter 366 in circuit 360, therefore, unblocks the AND-gate 362 for the passage of the recurrent clock pulses $Te$ on lead 342 by way of OR-gate 365 to an input of AND-gate 363 whose other input concurrently receives the signal $\overline{BC}$ so that the clock pulses appear on lead 353 as pulses C stepping the scanner 410.

OUTGOING CALL

The subscriber at post 400 lifts his handset 405 and operates his dial 406 to select the number of the party he wishes to call, this number being transmitted over lead 402 as an address code $O_2$ to register 310 for temporary storage. In principle, the dialing of the address may precede, accompany or follow the closure of the hook switch to energize the lead 401 with the readiness signal $0_1$; it will be assumed hereinafter, however, that the lifting of the handset precedes the selection of the address.

The appearance of readiness signal $0_1$ on an input of AND-gate 388 connected to lead 401 opens this AND-gate whose other input still receives the idle signal L from NOR-gate 381. AND-gate 388, in transmitting a signal $S_1$ through OR-gate 383, thereupon sets the flip-flop F1 whose set output $Q_1$ now energizes the NOR-gate 382 to change the state of energization of lead 352 from "1" to "0," thereby replacing the disconnect signal BC by the seizure signal BC. AND-gate 363 is now blocked so that clock pulses T*e* can no longer be transmitted to lead 353 and the stepping of scanner 410 stops. Both the transmitter 100 and the receiver 200 now have continuous access to the channel last explored.

Signal BC is inverted at element 372 to open the AND-gate 378 having one input connected to the output of this inverter, the other two inputs of gate 378 being energized by discrimination signal I on lead 403 (after entry of the called address in register 310) and by a signal $\overline{Q}_3$ on the reset output of flip-flop $F_3$ whereby a signal $S_2$ is generated to set the flip-flop F2 whose reset output, like that of flip-flop F4, is connected to an input of NAND-gate 379; the inputs of this gate thus receive respective signals $\overline{Q}_2$ and $\overline{Q}_4$. With the disappearance of signal $\overline{Q}_2$ from one of the inputs of NAND-gate 379, its output connected to lead 351 generates the readout signal TI to trigger the register 310 into communicating the address of the called party to emitter 120 and thence to transmitter 100 for broadcasting via the seized channel to all the other stations scanning this channel. Evidently, a station already engaged in another conversation will not receive this address and will therefore not respond. At the same time, a signal $Q_2$ from the set output of flip-flop F2 is delivered to lead 355 where it appears as the outgoing request signal TR sent out over the same channel by way of emitter 110 and transmitter 100.

NOR-gate 376, whose two inputs are respectively connected to leads 354 and 355, has an output prior to the appearance of signal TR so that AND-gate 389 passes the readiness signal $0_1$ on to lead 401 to trip the monoflop MS1 at an instant $t_1$ for a period $t_x$ sufficient to give the operator time to dial the address of the called party. Upon the nondestructive readout of this address to emitter 120, a pulse MT appears on lead 311 to feed the counter C1 which now counts a number of such pulses equal to 2N. This number is sufficient to let the address appear twice on each channel so that the called party will have time to reach the seized channel even if its scan had previously been halted on every other channel in response to request signals accompanied by the addresses of stations other than the calling or the called party. Responding to the reception of its own address together with the request signal TO from the local station, the remote station then transmits its own address together with engagement signal RO in manner described hereinafter so that lead 212 of the local station is energized and, via NOR-gate 381, cancels the idle signal L on lead 357.

In the event that the readiness signal $0_1$ was accidentally generated by failure to restore the handset 405 to its cradle or by an inadvertent dislodgment thereof, signal I will not come into existence and flip-flop F2 will not be set. NOR-gate 376 will therefore maintain its output beyond the time $t_x$ measured by monoflop MS1 so that AND-gate 391 conducts in response to the monoflop output $e(t)$ and transmits a reset signal $R_1$ to flip-flop F1. The switchover of this flip-flop to its normal state replaces the seizure signal BC on lead 352 by the disconnect signal $\overline{BC}$ whereby AND-gate 363 is unblocked to let the scanner 410 resume its operation.

If the call was properly initiated but the called station does not respond, counter C1 transmits a reset signal $R_2$ through OR-gate 375 to flip-flop F2 with resulting cancellation of request signal TR and readout signal TI. After an interval $t_x$ following the resetting of flip-flop F2, thus at time $t_1+t_x$, flip-flop F1 is also reset in the aforedescribed manner to restore the quiescent state.

The timely arrival of incoming engagement signal RO, accompanied by the address of the desired station, opens the AND-gate 386 in response to the identity signal A generated by comparator 330 on lead 331. The output of gate 386 is a setting signal $S_3$ transmitted through OR-gate 373 to flip-flop F3. The switching of this flip-flop extinguishes the signal $\overline{Q}_3$, thereby canceling the setting signal $S_2$ for flip-flop F2, and gives rise to an output signal $Q_3$ which traverses the OR-gates 374 and 375 to generate the outgoing engagement signal TO on lead 354 and to reset the flip-flop F2 with concurrent cancellation of request signal TR. The connection between the two stations has now been established and messages may be exchanged over the common channel.

When the calling subscriber restores the handset 405 to its cradle, lead 401 is deenergized so that inverter 393 recreates the reset signal $R_1$ whereby flip-flop F1 is switched to its normal state to release the channel.

If the called party hangs up, signal RO ceases and NOR-gate 381 brings back the idle signal L on lead 357, thereby energizing one of the inputs of AND-gate 390 whose other two inputs are concurrently energized by signals $0_1$ and TO. This trips the monoflop MS2 at an instant $t_2$ for a period $t_y$ long enough to bridge short term interruptions due, for example, to the fading of a radio signal. At the end of this period (i.e., at time $t_2+t_y$), and in the continuing presence of signal L, AND-gate 392 responds to the monoflop output $p(t)$ and energizes the OR-gate 384 to reset the flip-flop F1.

INCOMING CALL

When a previously idle channel is preempted by a remote subscriber wishing to communicate with the local station shown in FIGS. 1 and 2, incoming request signal RR appears on lead 211 as soon as that channel is reached by the scanner 410 of this station. With readiness signal $0_1$ absent from lead 401, AND-gate 364 is now open to energize the input of inverter 366 which in turn blocks the AND-gate 362 but biases one of the inputs of AND-gate 361 to open an alternate path for the transmission of pulses from lead 342 to lead 353. Since this alternate path includes the counter C2, no stepping pulse C comes into existence for a period equaling 2K. cycles of clock pulses T*e*. This period allows for the entry of the received address, assumed to be that of the local station, via detector 220 in register 320. Recognizing this address as its own, register 320 emits the signal RH on lead 323. With gate 385 either omitted or unblocked by the absence of an inhibition signal H′, recognition signal RH reaches the inverter 371 which thereupon deenergizes one of the inputs of NOR-gate 377 whose other input is also deenergized for want of the readiness signal $0_1$. NOR-gate 377 now emits the call signal H on lead 356 to alert the operator manning the post 400. At the same time, signal RH is applied to flip-flop F4 as a setting signal $S_4$ with consequent cancellation of the output signal $\overline{Q}_4$ of that flip-flop and generation of readout signal TI on lead 351.

Register 310, having not been loaded by a previous entry of the address of a called party, receives the address stored in register 320 which is transferred to it via lead 324 and coupling circuit 301. In response to signal TI, register 310 reads out this address—i.e., the calling code of the local station—to emitter 120 for transmission over the seized channel to the remote station. Since the station requesting the connection is already on the line, a single repetition of the address readout will usually suffice to establish the connection as indicated by the appearance of engagement signal RO on lead 212 in lieu of request signal RR on lead 211.

When the local subscriber answers, readiness signal $0_1$ appears on lead 401 and, together with recognition signal RH, opens the AND-gate 387 to generate the signals $S_1$ and $S_3$ in the outputs of OR-gates 383 and 373, respectively, thereby switching the flip-flops F1 and F3. The appearance of seizure signal BC on lead 352 blocks the AND-gate 363, as in the case of an outgoing call, so as to deactivate the scanner 410 independently of the delay period of counter C2 and the condition of gate 362. Since discrimination signal I is absent under these circumstances, flip-flop F2 remains reset. Flip-flop F3, however, again gives rise to the outgoing engagement signal TO on lead 354 to establish communication between the two stations.

Concurrently with the setting of flip-flop F4, i.e., at a time $t_3$, signal RH also trips the monoflop MS3 to generate a signal $z(t)$ for a limited period $t_z$, signal $z(t)$ entering the NOR-gate 382 and traversing the OR-gate 374 to generate the signals BC and TO even before the flip-flop F1 is switched by the locally generated readiness signal $0_1$. Period $t_z$ is of a duration designed to give the called subscriber time to respond and may vary for different kinds of telecommunication systems. If lead 401 is not energized when monoflop MS3 returns to normal, thus at the time $t_3+t_z$, the disconnect signal $\overline{BC}$ reappears on lead 352 to restart the scan.

Flip-flop F4, set by the signal $S_4$ in the presence of signal RH, is reset by a signal $R_4$ derived from the second stage of counter C1 to terminate the readout of the contents of register 310 after the second transmission of the local address. During the presence of signal TI, clearing signal Z is inhibited so that the several stages of outgoing register 310 are loaded by the simultaneous or successive entry of the local address with nondestructive readout from incoming register 320. Upon the termination of signal TI, register 310 is cleared whereas register 320 remains loaded until the disappearance of request signal RR and nonappearance of request signal RO reenergizes the lead 357 to generate the idle signal L.

The signals produced by the logic of FIG. 2 can be expressed by the following formulas:

$$R_1=\bar{O}_1+O_1\cdot(TR+TO)\cdot e(t)+O_1\cdot TO\cdot(\overline{RR+RO})\cdot p(t)$$

$$Q_2=\overline{\left(Q_3+BC+\frac{MT}{2N}\right)}\cdot[Q_2+(\bar{Q}_3\cdot I\cdot\overline{BC})]$$

$$Q_3=\overline{BC}\cdot(Q_3+A\cdot RO+RH\cdot O_1)$$

$$Q_4=\frac{MT}{2}\cdot(Q_4+RH)$$

$$TI=Q_2+Q_4$$

$$TR=Q_2$$

$$TO=Q_3+z(t)$$

$$H=RH\cdot\bar{O}_1$$

$$Z=\bar{O}_1$$

$$L=\overline{RR+RO}$$

REPEATER STATION

Figure 3:
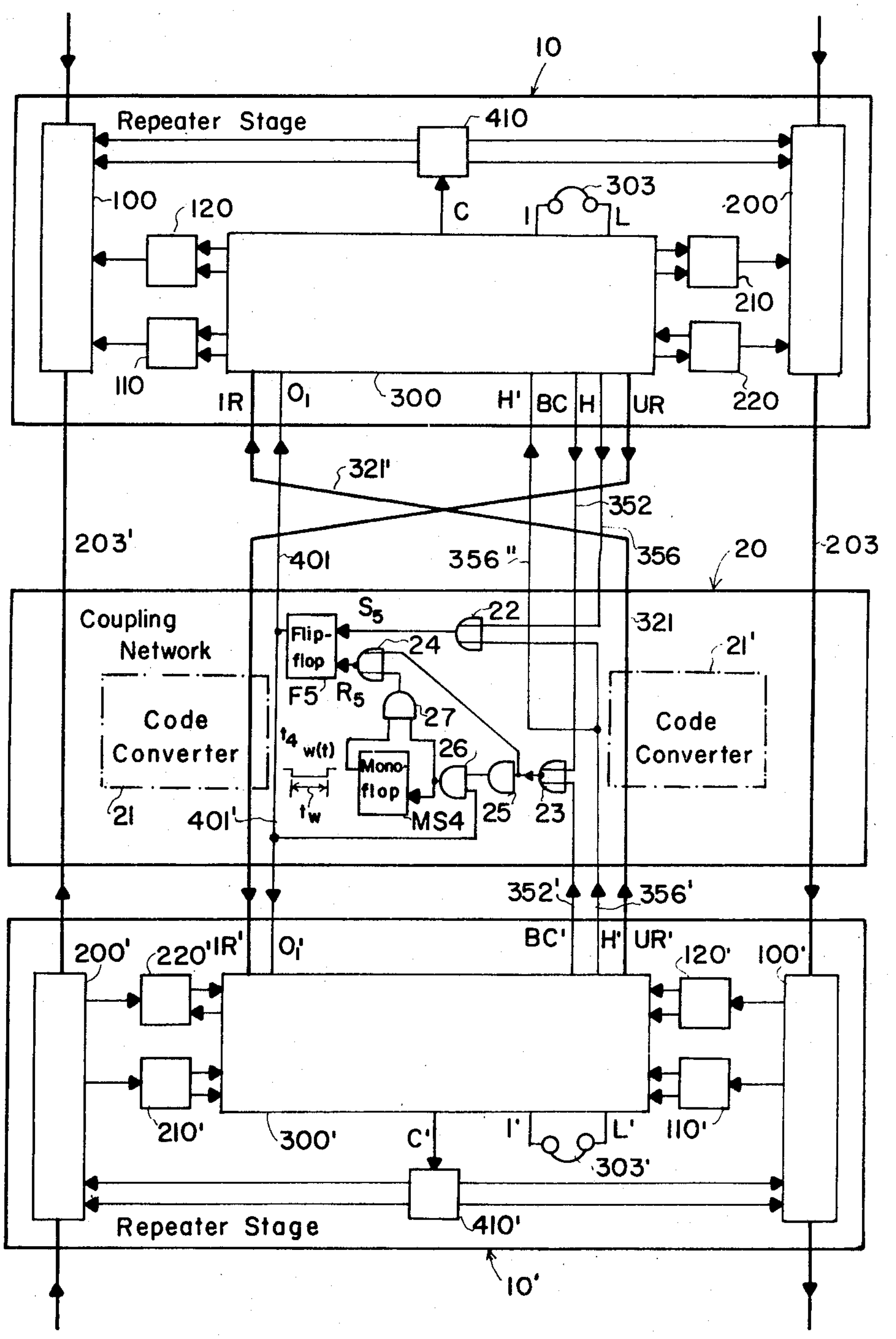
FIG. 3 is a block diagram of a repeater station incorporating two stages each similar to the terminal station of FIG. 1.

FIG. 3 shows a repeater station with two stages 10 and 10' interconnected by a coupling network 20, each of these stages being identical with the terminal station of FIG. 1 except for omission of the telephone apparatus 400; corresponding components have been designated by the same reference characters as in FIG. 1, with the addition of a prime mark in the case of stage 10'.

Figure 5:
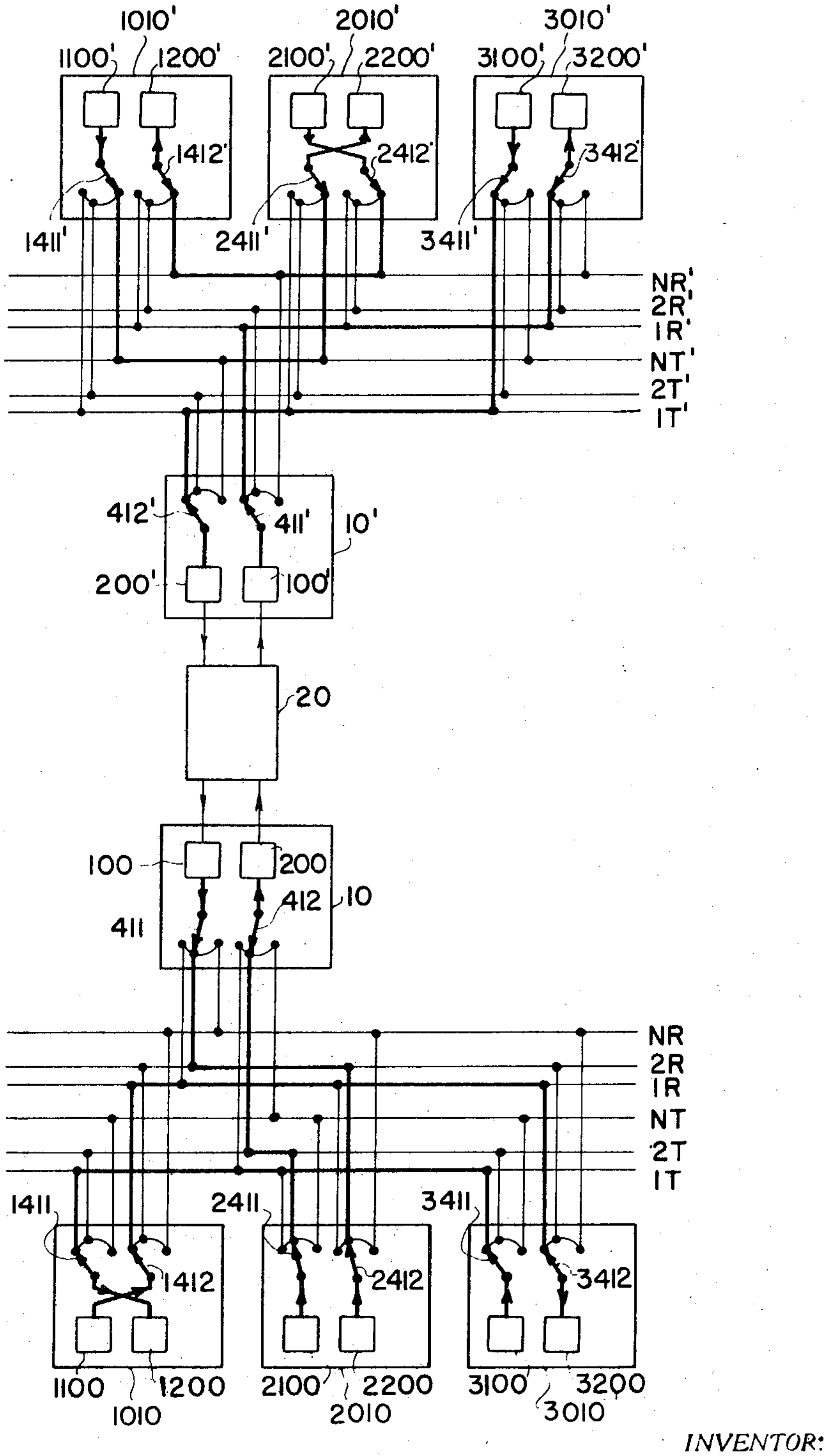
FIG. 5 is a view similar to FIG. 4, illustrating a modified communication system.

The transmitter 100 or 100' of each repeater stage is fed by a respective line 203' or 203 from the receiver 200' or 200 of the opposite stage. Lead 321 of stage 10 delivers the address codes UR to stage 10' as codes IR', the corresponding lead 321' similarly communicating address codes UR' from stage 10' to stage 10 as codes IR. If the two stages serve separate parts of the system (e.g. as shown in FIG. 5) in which the coding of the addresses is different, leads 321 and 321' may include respective code converters 21 and 21' within coupling network 20. Thus, for example, stage 10 may be exchanging address information with its affiliated subscriber stations in the form of dial pulses whereas stage 10' transmits and receives such information to and from its own subscribers in the form of DC potentials. The two subsystems respectively served by repeater stages 10 and 10' could also operate in different ranges of a radiofrequency band.

As in the case of a terminal station, the receivers 200 and 200' of the two repeater stages are always connected to an incoming branch of whichever channel is being explored under the control of the associated scanner 410 or 410'. With junctions 303 and 303' closed, leads I and L at stage 10 and I' and L' at stage 10' are permanently interconnected so that either stage can originate a call over an available channel upon receiving the necessary address information IR of IR' from the other stage. In the case of an incoming call to be relayed to another subscriber by way of the companion stage, logic network 300 or 300' generates the internal recognition signal RH (FIGS. 1 and 2) whenever the incoming address matches that of a terminal station served by the latter stage.

It will also be noted that one of the two repeater stages, here the stage 10', is given precedence over the other stage by having its lead 356' extended at 356'' to companion stage 10 for transmitting its own call signal H' to that stage as the inhibition signal applied to the inverting input of AND-gate 385 in FIG. 2. In this manner, if the two repeater stages are simultaneously locked in on the same channel or on different channels carrying the incoming request signal RR, only stage 10' will process the incoming call in the manner described above whereas stage 10 will be released and continue the scan at the slower rate imposed by counter C2 whenever the signal RR recurs.

Coupling network 20 includes an OR-gate 22, two NOR-gates 23 and 24, an inverter 25, an AND-gate 26 and a NAND-gate 27, along with a flip-flop F5 and a monoflop MS4. The two inputs or OR-gate 22 are connected to leads 356 and 356' to receive the call signal H or H'; the presence of either call signal generates a setting signal $S_5$ in the output of this OR-gate to switch the flip-flop F5 whereby readiness signals $0_1$ and $0_1'$ appear on lines 401 and 401' tied to the set output of this flip-flop.

If repeater stage 10 was the first to receive the incoming call from a terminal station and to generate the call signal H along with seizure signal BC, the energization of lead 401 by flip-flop F5 creates the condition of a response by the called party described above with reference to a terminal station. Lead 352, which is now continually deenergized to signify the existence of signal BC, removes voltage from one of the inputs of NOR-gate 23 whose other input, however, remains energized as the lead 356' of stage 10' still carries the disconnect signal $\overline{BC}$. Inverter 25, connected in cascade with NOR-gate 23, therefore applies voltage to one of the inputs of AND-gate 26 whose other input is connected via line 401' to the set output of flip-flop F5 whereby this AND-gate conducts and trips the monoflop MS4 whose operation is similar to that of monoflops MS1 and MS2 in FIG. 2. After a period $t_w$, measured by the monoflop from the instant $t_4$ of switchover of flip-flop F5, the return of voltage in the form of a signal $w(t)$ on one of the inputs of NAND-gate 27 cuts off the output of that gate if its other input, fed directly from AND-gate 25, is still energized by the lack of a response from stage 10', i.e., by the absence of signal BC'. Interval $t_w$ is long enough to allow the responding stage to react to the concurrent presence of a readiness signal, here $0_1'$, and an incoming address, here the code IR', in the manner of a terminal station initiating a call as described above with reference to the subscriber station of FIGS. 1 and 2. As the two inputs of NOR-gate 24 are respectively connected to the outputs of NAND-gate 27 and NOR-gate 23, coupling network 20 will be released by the output of NOR-gate 24 if signal BC′ is not generated before the monoflop MS4 has run its course at time $t_4+t_w$ or upon the subsequent disappearance of either of the two seizure signals BC and BC′.

Figure 4:
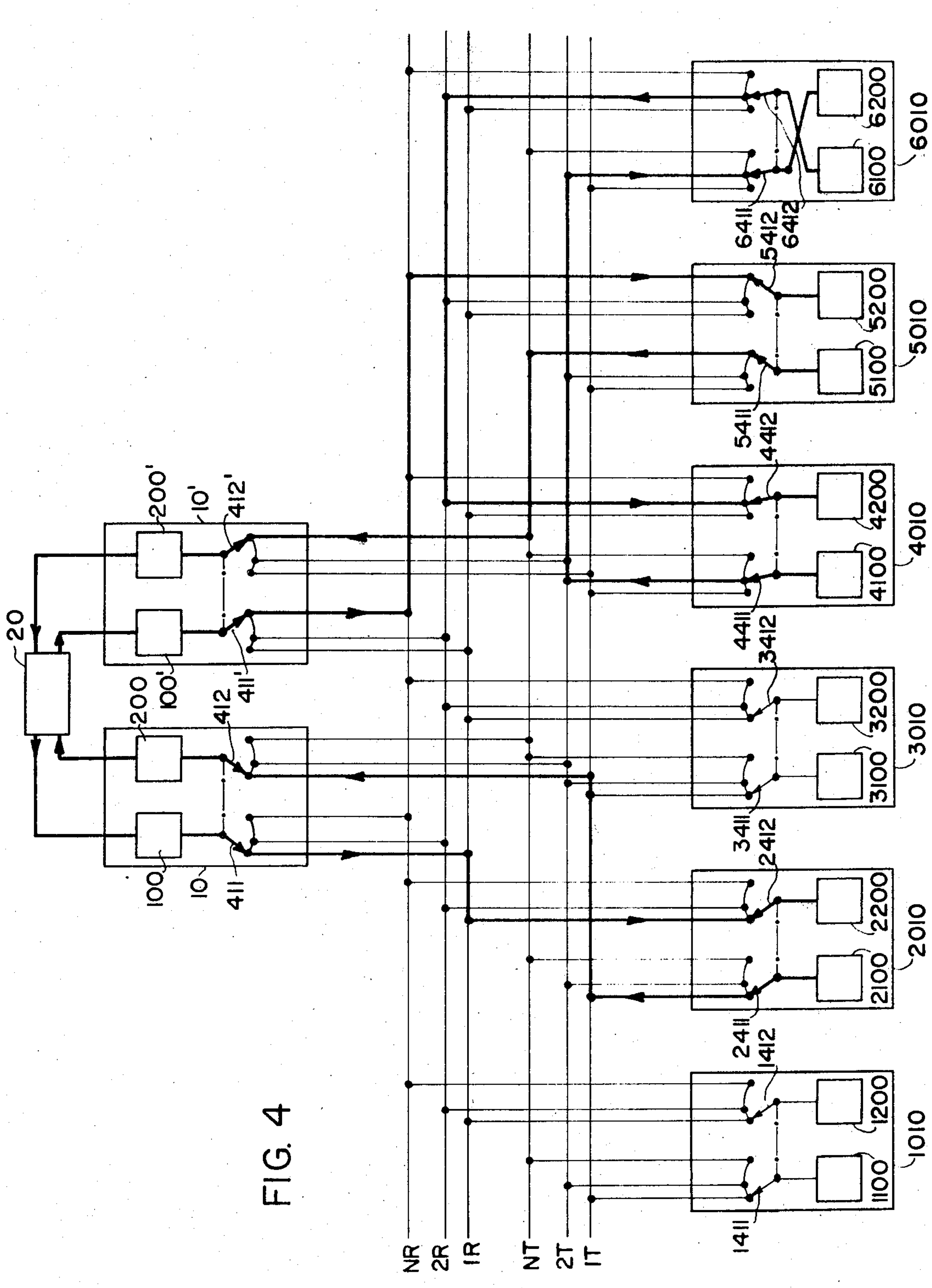
FIG. 4 shows the overall layout of a communication system including several terminal stations as shown in FIG. 1 and a repeater station as shown in FIG. 3.

FIG. 4 shows the overall layout of a telecommunication system in which all terminal stations have access to one another and to the two repeater stages 10 and 10′ of FIG. 3 via a common set of N channels. Each channel is represented by two lines 1T, 1R; 2T, 2R;...NT, NR. All the transmitting lines 1T–NT are accessible to the transmitters 1,100, 2,100, 3,100, 4,100, 5,100, 6,100 of the several terminal stations 1,010, 2,010, 3,010, 4,010, 5,010, 6,010 via respective selectors 1,411, 2,411, 3,411, 4,411, 5,411, 6,411 symbolizing the transmitter controls of the associated channel scanners, all the receiving lines 1R–NR being similarly accessible to the receivers 1,200, 2,200, 3,200, 4,200, 5,200, 6,200 of these stations by way of respective selectors 1,412, 2,412, 3,412, 4,412, 5,412, 6,412 symbolizing the receiver controls of the scanners. On the other hand, the transmitters 100 and 100′ of repeater stages 10 and 10′ have access to receiving lines 1R–NR via respective selectors 411 and 411′ whereas the corresponding receivers 200 and 200′ have access to the transmitting lines 1T–NT via respective selectors 412 and 412′.

As indicated in heavy lines in FIG. 4, two subscribers at any of the six illustrated terminal stations may communicate directly with one another if the calling subscriber, here station 6,010, switches the connections between its transmitting and receiving sections, on the one hand, and the corresponding selectors. Thus, transmitter 6,100 is shown connected via selector 5,412 to the receiving branch 2R of the second channel which in turn is connected by way of selector 4,412 of station 4,010 to the receiver 4,200 of the latter station; transmitter 4,100 of station 4,010 communicates with receiver 6,200 of station 6,010 by way of selectors 4,411 and 6,411 via the transmitting branch 2T of the same channel.

On the other hand, stations 2,010 and 5,010 are shown communicating by way of repeater 10, 10′, 20. Without any switching of the internal connections of these subscriber stations, transmitter 2,100 of station 2,010 is connected through its selector 2,411 to branch 1T of the first channel which in turn is connected by way of selector 412 to receiver 200 of repeater stage 10 communicating through coupling network 20 with the transmitter 100′ of companion stage 10′. The output of the relaying transmitter 100′ goes over selector 411′ to branch NR of the $N^{th}$ channel and thence by way of selector 5,412 to the receiver 5,200 of station 5,010. Conversely, transmitter 5,100 of the last-mentioned station sends out information to receiver 2,200 of station 2010 by way of selector 5411, branch NT of the $N^{th}$ channel, selector 412′ and receiver 200′ of stage 10′, network 20, transmitter 100 and selector 411 of stage 10, and branch 1R of the first channel. It will thus be seen that different channels are used between the calling subscriber and the first repeater stage and between the called subscriber and the second repeater stage but that, in the system of FIG. 4, these channels are interchangeable.

In FIG. 5, on the other hand, the two repeater stages 10 and 10′ are associated with different sets of channels, i.e., the N channels represented by transmitting paths 1T, 2T...NT and receiving paths 1R, 2R...NR and the N channels represented by transmitting paths 1T′, 2T′...NT′ and receiving paths 1R′, 2R′...NR′. Of the two groups of terminal stations having respective access to these sets, three stations 1,010, 2,010, 3,010 of the first group and three stations 1,010′, 2,010′, 3,010′ of the second group have been shown. The transmitters, receivers and selectors of the several stations have been given the same designations as in FIG. 4 with the addition of a prime mark in the case of the second group.

It will be seen that the stations of each group may communicate directly with one another, as indicated for stations 1,010 and 3,010 utilizing channel 1T, 1R and for stations 1,010′ and 2,010′ utilizing channel 1T′, 1R′. Station 2,010 is shown to converse with station 3,010′ by way of lines 2T and 2R, constituting the second channel of the first set, and lines 1T′ and 1R′, constituting the first channel of the second set, through the repeater 10, 10′, 20.

I claim:

1. In a system for the selective establishment of two-way communication between a multiplicity of stations over a lesser number of communication channels each adapted to carry supervisory signals along with message and address information between any two communicating stations, the improvement wherein each station comprises:

receiving means for retrieving address information, individual to the respective station, and supervisory signals from any channel connected thereto;

scanning means for repetitively connecting said receiving means to each channel in succession for examining the busy/idle status of same;

transmitting means synchronized with said receiving means for periodically gaining access to the channels concurrently examined by the latter;

signal-generating means connected to said transmitting means for feeding either of two types of outgoing busy signals to a channel accessible thereto, said types of busy signals including a request signal and an engagement signal;

monitoring means connected to said receiving means for ascertaining the availability of a channel under examination from the absence of corresponding types of incoming busy signals thereon, said monitoring means further being responsive to a locally generated readiness signal for arresting said scanning means and for actuating said signal-generating means to emit an outgoing request signal calling for a response from a remote station, thereby seizing such available channel;

switch means controlled by said monitoring means upon detection of an incoming request signal originating from a remote station on a channel under examination for arresting said scanning means on said channel under examination and operating said signal-generating means to emit an outgoing engagement signal over the seized channel; and disconnect means controlled by said monitoring means for restarting said scanning means to release a seized channel upon nonreception of an incoming engagement signal from a remote station.

2. The improvement defined in claim 1 wherein each station identified by an individual address comprises register means connectable to said transmitting means, under the control of said monitoring means upon detection of said incoming request signal, for accompanying the emission of said outgoing engagement signal with a readout of the address of the local station over the seized channel.

3. The improvement defined in claim 2 wherein each station comprises selector means for entering, upon the inception of an outgoing call, the address of a called station in said register means for readout together with said outgoing request signal over a channel seized in response to said readiness signal, said register means being operative to emit a recognition signal upon detecting the address of the local station together with said incoming request signal, each station further comprising storage means connected to said receiving means for temporarily registering the address of a remote station responding over the seized channel and comparison means for generating an identity signal upon ascertainment of a match between the addresses in said register means and said storage means, said monitoring means being responsive to the absence of said recognition signal for releasing a channel seized upon detection of said incoming request signal and being further responsive to the presence of said identity signal for modifying the operation of said signal-generating means to emit said outgoing engagement signal in lieu of said outgoing request signal while terminating the transmission of the address readout from said register means.

4. The improvement defined in claim 3 wherein each station comprises timing means synchronized with said scanning means and controlled by said monitoring means for measuring a period sufficient to receive address information accompanying said incoming request signal on a channel seized by a remote station, said monitoring means maintaining said disconnect means inoperative during periods sufficient to establish twosway communication between a local station and a remote station.

5. The improvement defined in claim 4 wherein said timing means includes a source of periodic clock pulses for stepping said scanning means at a predetermined rate, circuit means forming a pair of parallel paths for said clock pulses between said source and said scanning means, gate means in one of said paths blockable by said monitoring means in the presence of an incoming engagement signal, and counting means in the other of said paths for delaying the passage of a clock pulse for a predetermined number of clock pulse cycles.

6. The improvement defined in claim 4 wherein said timing means comprises monostable means triggerable by said locally generated command upon seizure of a channel for measuring an interval greater than that required for operation of said selector means and transmission of the selected address with inhibition of said disconnect means during said interval.

7. The improvement defined in claim 4 wherein said channels are radiolinks, said timing means comprising monostable means triggerable by the complement of an incoming engagement signal for measuring an interval greater than the normal fading time of a radio signal with inhibition of said disconnect means during said interval.

8. The improvement defined in claim 4 wherein each station is provided with call means responsive to said recognition signal for attracting the attention of an operator, said timing means comprising monostable means triggerable by said recognition signal for measuring an interval sufficient for generation of said readiness signal by the operator and for actuating said disconnect means in the absence of said readiness signal at the end of said interval.

9. The improvement defined in claim 4 wherein said register means has an output generating a counting pulse upon every readout of an address stored therein, said timing means including counter means for said counting pulses operative to enable said disconnect means upon generation of a predetermined number of said counting pulses.

10. The improvement defined in claim 9 wherein said timing means further includes logical circuitry connected to an output of said counting means for enabling said disconnect means after said predetermined number of counting pulses in the presence of said readiness signal and in the absence of said identity signal.

11. The improvement defined in claim 10 wherein said switch means comprises first bistable means settable by said readiness signal alternately in the absence of an incoming busy signal and in the presence of said recognition signal for generating a seizure signal maintaining said scanning means inoperative, said first bistable means being alternately resettable by the complement of said readiness signal and by the concurrent absence of incoming and outgoing busy signals; said signal-generating means comprising second bistable means settable by said seizure signal for producing an outgoing request signal and a readout signal for said register means, third bistable means settable concurrently with said first bistable means by the joint presence of said readiness and recognition signals and also settable independently of said first bistable means by the joint presence of said identity signal and an incoming engagement signal for resetting said second bistable means and producing an outgoing engagement signal, and fourth bistable means settable by said recognition signal for producing said readout signal and said outgoing request signal, said second bistable means being also resettable by said logical circuitry under the control of said counting means and by the complement of said seizure signal, said third bistable means being resettable by the complement of said seizure signal, said fourth bistable means being resettable by an alternate output of said counting means after a number of counting pulses substantially less than said predetermined number.

12. The improvement defined in claim 3 wherein said stations include a multiplicity of terminal stations and a pair of repeater stages interconnected by a coupling network, the receiving means of each repeater stage being operative to emit said recognition signal upon detecting the address of any terminal station accessible via a channel monitored by the other repeater stage.

13. The improvement defined in claim 12 wherein one of said repeater stages is provided with gating means connected to receive, via said coupling network, a call signal derived from a recognition signal generated at the other repeater stage, said gating means rendering ineffectual a recognition signal generated at said one of said repeater stages, thereby giving precedence to said other repeater stage upon substantially concurrent detection of incoming request signals by both repeater stages.

14. The improvement defined in claim 12 wherein said coupling network comprises cross connections between said register means and said storage means of said repeater stages for transferring an incoming address from the storage means of one repeater stage to the register means of the other repeater stage.

15. The improvement defined in claim 14 wherein each repeater stage is provided with circuit means controlled by said monitoring means, upon exploration of an idle channel, for operating said switch means to seize such channel and for reading out an address transferred from the other repeater stage together with an outgoing request signal in response to a readiness signal generated at said coupling network by a call signal derived from a recognition signal at said other repeater stage.

16. The improvement defined in claim 12 wherein said channels are divided into first and second branches, said first branches being accessible to the transmitting means of said terminal stations and to the receiving means of said repeater stages, said second branches being accessible to the receiving means of said terminal stations and to the transmitting means of said repeater stages.

17. The improvement defined in claim 12 wherein said channels are grouped in a first set, accessible to some of said terminal stations and one of said repeater stages, and a second set, accessible to the remaining terminal stations and the other of said repeater stages.

* * * * *

PO-1050
(5/69)

UNITED STATES PATENT OFFICE
CERTIFICATE OF CORRECTION

Patent No. 3,634,627 Dated 14 September 1972

Inventor(s) Nicola VALENTINI

It is certified that error appears in the above-identified patent and that said Letters Patent are hereby corrected as shown below:

In the heading, line [72] read the inventor's surname as – VALENTINI -- .

Signed and sealed this 23rd day of January 1973.

(SEAL)
Attest:

EDWARD M.FLETCHER,JR.
Attesting Officer

ROBERT GOTTSCHALK
Commissioner of Patents